United States Patent
Simmons

(10) Patent No.: US 11,483,979 B2
(45) Date of Patent: Nov. 1, 2022

(54) DOUBLE-TAB BAFFLE FOR AN AGRICULTURAL BALER

(71) Applicant: CNH Industrial America LLC, New Holland, PA (US)

(72) Inventor: Scott C. Simmons, Lititz, PA (US)

(73) Assignee: CNH Industrial America LLC, New Holland, PA (US)

(*) Notice: Subject to any disclaimer, the term of this patent is extended or adjusted under 35 U.S.C. 154(b) by 364 days.

(21) Appl. No.: 16/677,155

(22) Filed: Nov. 7, 2019

(65) Prior Publication Data

US 2021/0137014 A1     May 13, 2021

(51) Int. Cl.
*A01F 15/07*     (2006.01)

(52) U.S. Cl.
CPC .... *A01F 15/071* (2013.01); *A01F 2015/0725* (2013.01)

(58) Field of Classification Search
CPC .............................................. A01F 2015/0725
USPC .......................................................... 53/587
See application file for complete search history.

(56) References Cited

U.S. PATENT DOCUMENTS

| | | | |
|---|---|---|---|
| 5,036,642 A * | 8/1991 | Underhill | A01F 15/0715 53/118 |
| 5,479,767 A * | 1/1996 | McClure | A01F 15/07 100/15 |
| 6,886,307 B2 * | 5/2005 | Viaud | A01F 15/0715 53/118 |
| 7,181,900 B2 | 2/2007 | Hood et al. | |
| 8,555,604 B2 | 10/2013 | Reijersen Van Buuren | |
| 8,656,686 B2 * | 2/2014 | Smith | A01F 15/0715 53/216 |
| 9,474,212 B2 * | 10/2016 | Paillet | A01F 15/0715 |
| 10,674,673 B2 * | 6/2020 | Gresset | B65B 41/12 |
| 2006/0242931 A1 * | 11/2006 | Ryse | A01F 15/0715 53/587 |
| 2015/0305244 A1 * | 10/2015 | Gresset | B65B 41/12 53/587 |
| 2018/0352749 A1 | 12/2018 | Gresset et al. | |

FOREIGN PATENT DOCUMENTS

WO    2005/009112 A2    2/2005

* cited by examiner

*Primary Examiner* — Robert F Long
*Assistant Examiner* — Xavier A Madison
(74) *Attorney, Agent, or Firm* — Peter Zacharias; Patrick Sheldrake

(57) ABSTRACT

A duckbill assembly of a wrapper for an agricultural baler. The duckbill assembly includes a frame, at least one roller movably connected to the frame and configured for spreading a wrapping material, an upper baffle connected to the frame, and a lower baffle connected to the frame and located underneath the upper baffle. The lower baffle has a width, a first set of grippers, and a second set of grippers. The first and second set of grippers are configured for spreading the wrapping material across the width of the lower baffle.

18 Claims, 3 Drawing Sheets

DOUBLE-TAB BAFFLE FOR AN AGRICULTURAL BALER

BACKGROUND OF THE INVENTION

The present invention pertains to agricultural balers and, more specifically, to a duckbill assembly of a wrapper of an agricultural baler.

Agricultural harvesting machines, such as balers, are used to consolidate and package crop material so as to facilitate the storage and handling of the crop material for later use. In the case of hay or silage, a mower-conditioner is typically used to cut and condition the crop material. In the case of straw, an agricultural combine discharges non-grain crop material from the rear of the combine defining the straw (such as wheat or oat straw) which is to be picked up by the baler. The cut crop material is typically raked into a windrow, and a baler, such as a large square baler or round baler, straddles the windrows and travels along the windrows to pick up the crop material and form it into bales.

A round baler may generally include a frame, supported by wheels, a pickup unit to engage and lift the crop material into the baler, a cutting unit, a main bale chamber for forming a bale, and a wrapping mechanism, i.e., wrapper, for wrapping or tying a material around the bale after it has been formed in the main bale chamber. As the baler is towed over a windrow, the pickup unit lifts the crop material into the baler. Then, the crop material may be cut into smaller pieces by the cutting unit. As the crop material enters the main bale chamber, multiple carrier elements, e.g. rollers, chains and slats, and/or belts, will begin to roll a bale of hay within the chamber. These carrier elements are movable so that the chamber can initially contract and subsequently expand to maintain an appropriate amount of pressure on the periphery of the bale. After the bale is formed and wrapped by the wrapper, the rear of the baler is configured to open for allowing the bale to be discharged onto the field.

A typical wrapper generally includes a net or twine wrapping material, one or more rollers, actuators, linkages, and a duck bill assembly. The duck bill assembly may include a frame, spreader rollers, upper and lower baffles, and a knife for cutting the wrapping material. The lower baffle typically has baffle tabs or protrusions that are located in a line across the width of the baffle. These baffle tabs contact and keep the wrapping material taught or stretched across the width of the baffle so that the wrapping material evenly wraps around the width of the bale. When a sufficient amount of wrapping material has been applied to the bale, the duck bill assembly will rotate so that the knife will cut the wrapping material, ending the wrapping process. Sometimes the wrapping material will become jammed, bunched, or pulled inwardly toward the center of the lower baffle, which then causes the wrapping material to insufficiently spread across the width of the lower baffle. In such circumstances, the bale will be unevenly and/or incompletely wrapped such that the lateral ends of the bale may not be covered by wrapping material. As can be appreciated, poorly wrapped bales may lead to hay loss and transport or storage issues.

What is needed in the art is a cost-effective and improved duckbill assembly for applying wrapping material onto the bale.

SUMMARY OF THE INVENTION

In one exemplary embodiment formed in accordance with the present invention, there is provided a duckbill assembly of a wrapper for an agricultural baler. The duckbill assembly includes a frame, one or more rollers, and pair of upper and lower baffles. The lower baffle is a double-tab baffle that includes a first and second set of gripper tabs for engaging with and retaining, i.e., spreading, the wrapping material across the width of the lower baffle. Thereby, since the wrapping material is consistently retained at its maximum width, by the gripper tabs, the full width of the bale is accordingly covered by the wrapping material.

In another exemplary embodiment formed in accordance with the present invention, there is provided a duckbill assembly of a wrapper for an agricultural baler. The duckbill assembly includes a frame, at least one roller movably connected to the frame and configured for spreading a wrapping material, an upper baffle connected to the frame, and a lower baffle connected to the frame and located underneath the upper baffle. The lower baffle has a width, a first set of grippers, and a second set of grippers. The first and second set of grippers are configured for spreading the wrapping material across the width of the lower baffle.

In yet another exemplary embodiment formed in accordance with the present invention, there is provided an agricultural baler that includes a main frame, a pickup unit connected to the main frame and configured for lifting a crop material from a field, a bale chamber located downstream of the pickup unit and configured for forming a bale, and a wrapper connected to the main frame. The wrapper includes a duckbill assembly configured for spreading and applying a wrapping material onto the bale. The duckbill assembly includes a frame, at least one roller movably connected to the frame and configured for spreading a wrapping material, an upper baffle connected to the frame, and a lower baffle connected to the frame and located underneath the upper baffle. The lower baffle has a width, a first set of grippers, and a second set of grippers. The first and second set of grippers are configured for spreading the wrapping material across the width of the lower baffle.

In yet another exemplary embodiment formed in accordance with the present invention, there is provided a method for operating an agricultural vehicle. The method includes an initial step of providing a duckbill assembly of a wrapper for the agricultural vehicle. The duckbill assembly includes a frame, at least one roller movably connected to the frame and configured for spreading a wrapping material, an upper baffle connected to the frame, and a lower baffle connected to the frame and located underneath the upper baffle. The lower baffle has a width, a first set of grippers linearly positioned across the width of the lower baffle at a first location, and a second set of grippers linearly positioned across the width of the lower baffle at a second location. The wrapping material has a travel path through the duckbill assembly which extends in between the upper baffle and the lower baffle. The method further includes spreading, by the second set of grippers, the wrapping material across the width of the lower baffle at the second location, and spreading, by the first set of grippers, the wrapping material across the width of the lower baffle at the first location, which is downstream of the second location along the travel path of the wrapping material. The method also includes the step of applying, by the duckbill assembly, the wrapping material onto a bale such that a width of the bale is covered by wrapping material.

One possible advantage of the exemplary embodiment of the agricultural baler is that the full width of the wrapping material is spread across the lower baffle and thereby the full width of the bale is completely covered by the wrapping material.

Another possible advantage of the exemplary embodiment of the agricultural baler is that the wrapper cost-effectively and consistently covers the full width of the bale.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown. Like numerals indicate like elements throughout the drawings. In the drawings.

DETAILED DESCRIPTION OF THE INVENTION

The terms "forward", "rearward", "left" and "right", when used in connection with the agricultural baler and/or components thereof are usually determined with reference to the direction of forward operative travel of the towing vehicle, but they should not be construed as limiting. The terms "longitudinal" and "transverse" are determined with reference to the fore-and-aft direction of the towing vehicle and are equally not to be construed as limiting.

Figure 1:
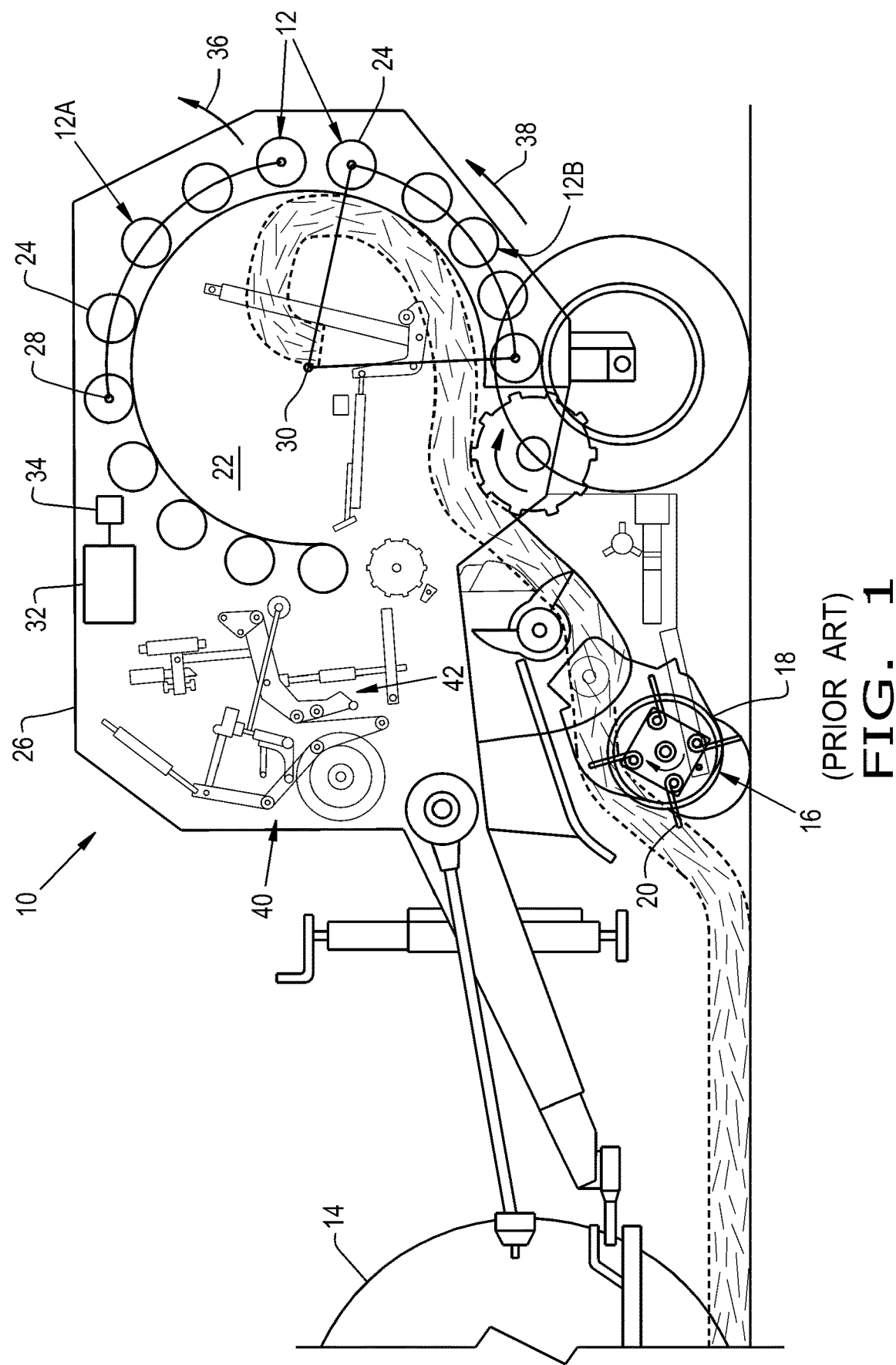
FIG. 1 illustrates a side cross-sectional view of a known agricultural baler that has a pickup unit, a bale chamber, and a wrapper.

Referring now to the drawings, and more particularly to FIG. 1, there is shown a cross-sectional, side view of a prior art round baler 10 which may be towed by an agricultural vehicle 14, such as a tractor 14. Alternatively, the round baler 10 may be a self-propelled baler.

Crop material is lifted from windrows into the baler 10 by a pickup unit 16. The pickup unit 16 includes a rotating pickup reel 18 with tine bars and tines 20, which move the crop rearward toward a bale chamber 22. The reel 18 is rotatable in an operating direction for lifting the crop material off of the ground. In general, the crop material is rolled into a bale of a predetermined size within the bale chamber 22, and then is discharged through a tail gate arrangement 12 onto the field, where it is subsequently picked up for transport.

The bale chamber 22 includes a plurality of carrier elements 24 carried by a frame 26. The carrier elements 24 are arranged in an arcuate arrangement around the bale chamber 22, and function to engage and roll the expanding bale as the crop material is fed into the bale chamber 22. In the illustrated embodiment, the carrier elements 24 are configured as rollers 24. However, the carrier elements can be variously formed, such as rollers, chains and slats, and/or belts.

The carrier elements 24 may be paired with an upper tail gate arrangement 12A and a lower tail gate arrangement 12B. The upper tail gate arrangement 12A has a first pivot axis 28, and the lower tail gate arrangement 12B has a second pivot axis 30. The upper and lower tail gate arrangements 12A, 12B may rotate to open the bale chamber 22 for accordingly allowing the bale to exit the bale chamber 22.

The agricultural baler 10 can further include an electrical processing circuit 32 which is configured for carrying out a bale discharge operation using the upper tail gate arrangement 12A and the lower tail gate arrangement 12B. The electrical processing circuit 32 can carry out the bale discharge operation, based on the following discharge sequence. The electrical processing circuit 32 may first sense a full bale condition within the bale chamber 22 using an appropriate sensor 34, corresponding to a predetermined size of the bale within the bale chamber 22. Then the upper tail gate arrangement 12A may be opened by pivoting the upper tail gate arrangement 12A about the first pivot axis 28 to an open position (in an upward direction, as shown by directional arrow 36 in FIG. 1). Next, the bale may be ejected by pivoting the lower tail gate arrangement 12B about the second pivot axis 30 to an eject position (counter-clockwise in an upward direction, as shown by directional arrow 38 in FIG. 1). It should be appreciated that the electrical processing circuit 32 is coupled with suitable actuators (not shown), which are in turn coupled with the upper tail gate arrangement 12A and the lower tail gate arrangement 12B, for pivoting the upper tail gate arrangement 12A and the lower tail gate arrangement 12B about their respective pivot axis 28, 30.

The agricultural baler 10 can further include a wrapper 40 for wrapping the bale with a wrapping material (e.g., mesh or twine), after the full bale condition is sensed and prior to opening the upper tail gate 12. The wrapper 40 generally includes a net or twine wrapping material, one or more rollers, actuators, linkages, sensors, and a duck bill assembly 42. The duck bill assembly 42 may include a frame, spreader rollers, upper and lower baffles, and a knife for cutting the twine (not shown). The lower baffle may include baffle tabs that are located in a line across the width of the baffle (not shown). The baffle tabs contact and keep the wrapping material spread across the width of the baffle. As can be appreciated, the operation of the wrapper 40 may be automatically controlled by the electrical processing circuit 32.

Figure 2:
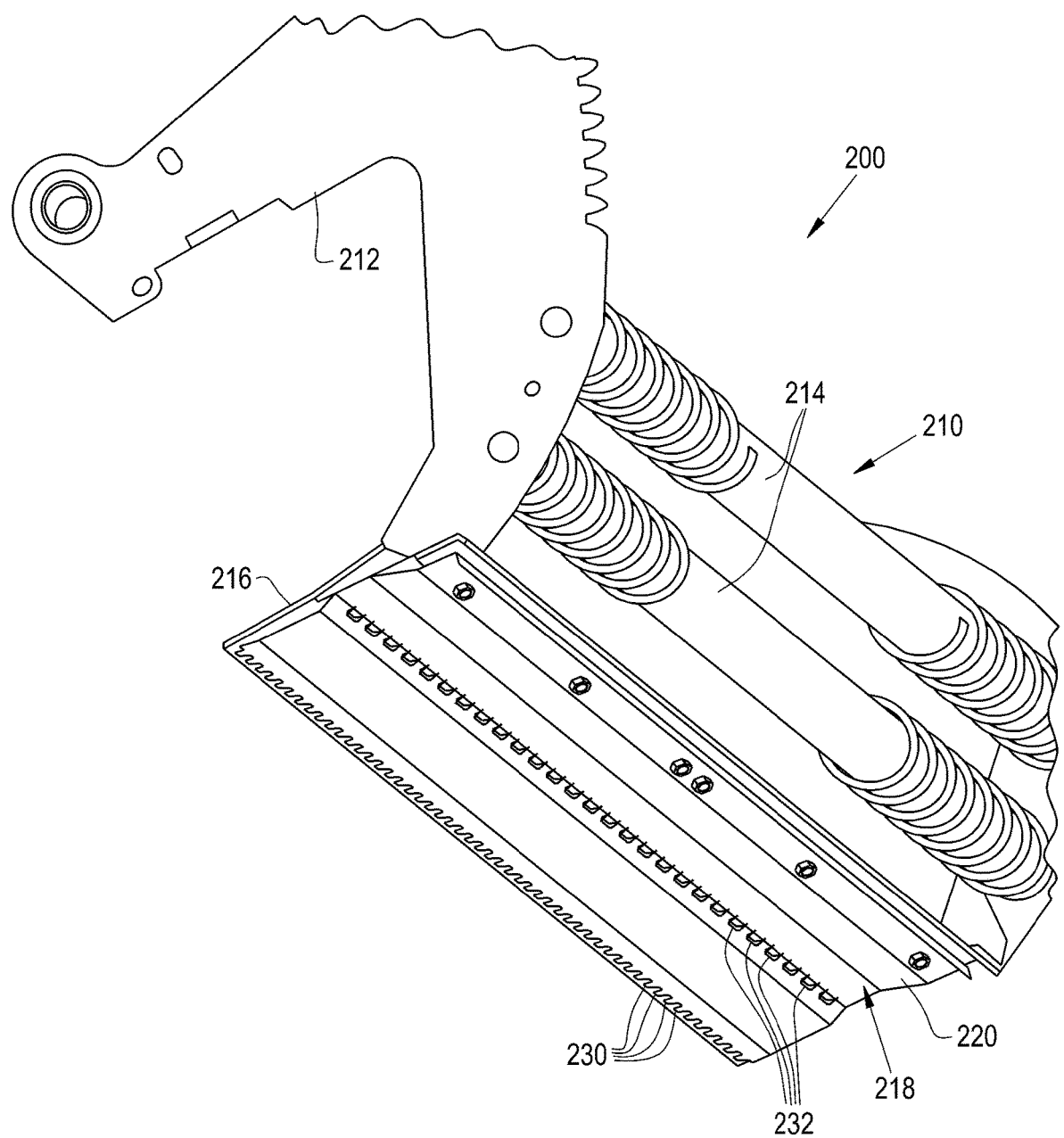
FIG. 2 illustrates a front perspective view of an exemplary embodiment of a wrapper for an agricultural baler, the wrapper includes a duckbill assembly with a double-tab baffle, in accordance with an exemplary embodiment of the present invention.
Figure 3:
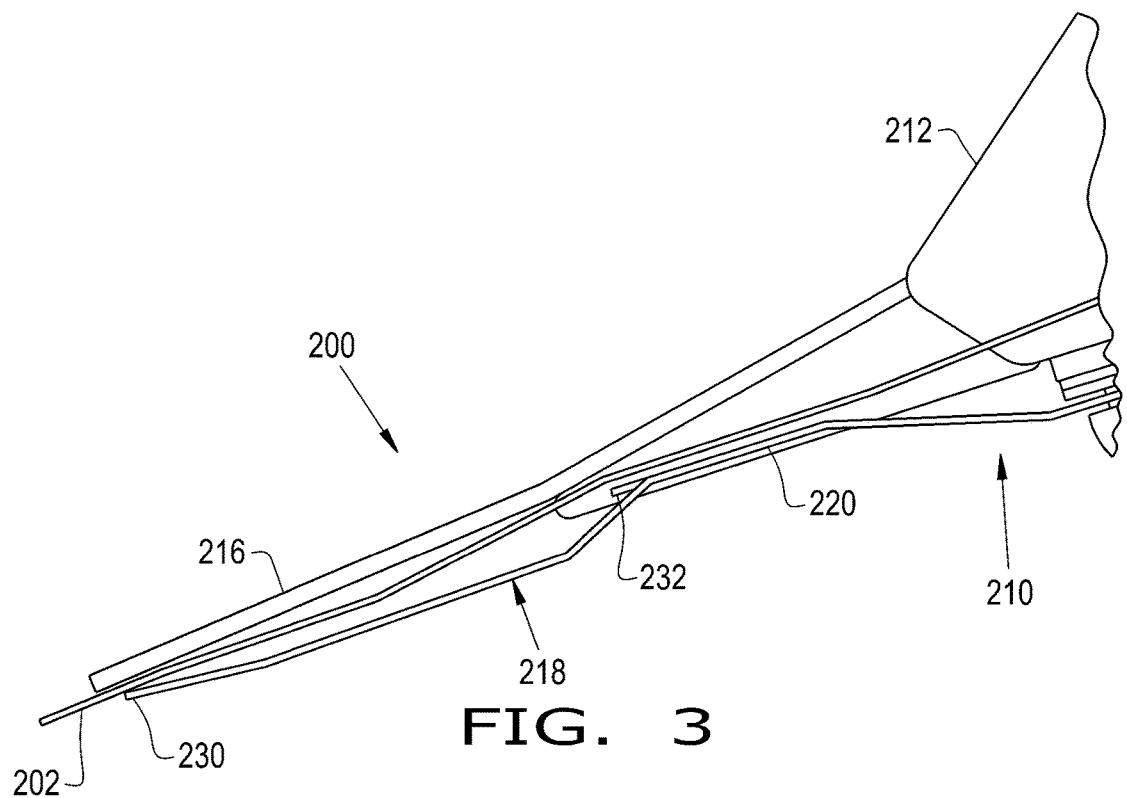
FIG. 3 illustrates a side view of the wrapper of FIG. 1.
Figure 4:
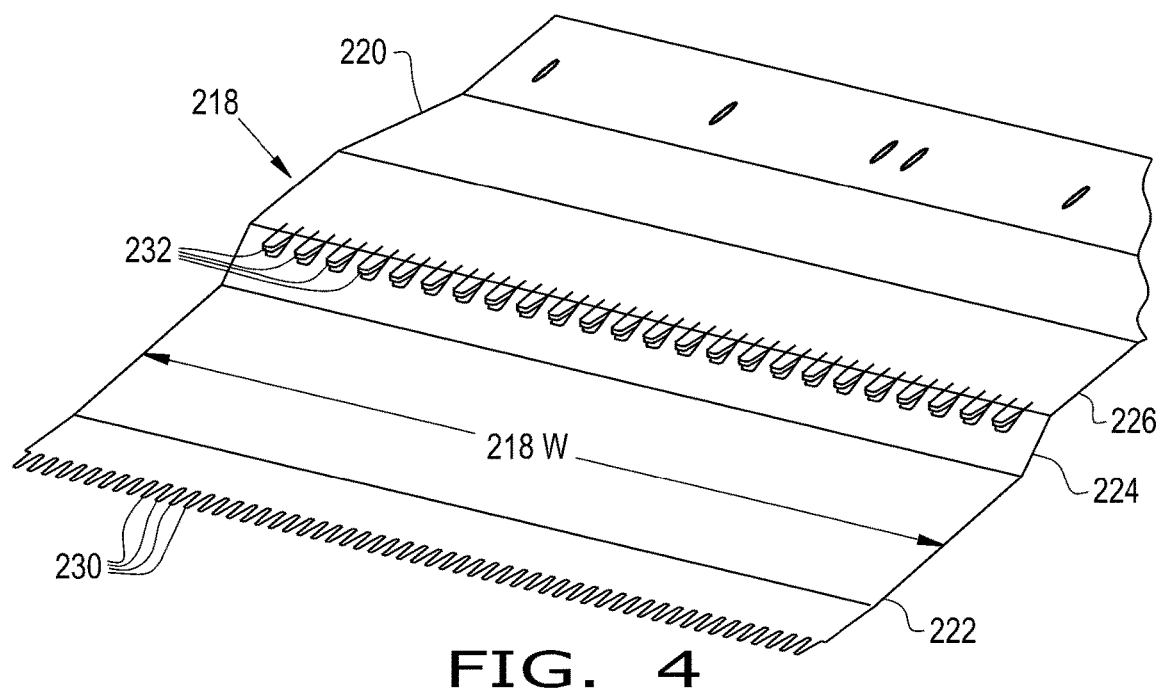
FIG. 4 illustrates a top perspective view of the double-tab baffle of the wrapper of FIGS. 2-3.

Referring now to FIGS. 2-4, there is shown an exemplary embodiment of a wrapper 200 for an agricultural baler, such as the baler 10 as described above. The wrapper 200 may be connected to and supported by the main frame of the baler. The wrapper 200 may include a duckbill assembly 210 and a roll spindle assembly (not shown). It should be appreciated that the wrapper 200 may be incorporated into any desired agricultural baler.

The duckbill assembly 210 is configured for spreading and applying a wrapping material 202 onto the bale (FIG. 3). The duckbill assembly 210 may generally include a frame 212, at least one roller 214, an upper baffle 216, and a lower baffle 218. The duckbill assembly 210 may further include a knife, various linkages and actuators, and a rectangular-plate tool for inserting the wrapping material 202 between the upper and lower baffles 216, 218.

The frame 212 may be pivotally connected to the main frame of the baler. The frame 212 may comprise a pair of angled support arms which pivotally connect to the main frame at one end and mount the rollers 214 and the baffles 216, 218 at the other end. However, the frame 212 may be in the form of any desired frame. The frame 212 may comprise any desired material, such as metal.

Each roller 214 is movably, e.g. rotatably, connected to the frame 212 and helps to spread the wrapping material 202 from its spindle onto the bale. Each roller 214 may be located upstream of the baffles 216, 218. Each roller 214 may include flighting and/or protrusions for engaging with the wrapping material 202. Each roller 214 may be in the form of any desired roll or roller, and may comprise any desired material.

The upper baffle 216 is connected to the frame 212. The upper baffle 216 may have a substantially rectangular body which is bent such that the upper baffle 216 extends rearwardly and downwardly away from the frame 212. The upper baffle 216 may be in the form of a sheet metal plate. However, the upper baffle 216 may comprise any desired shape and material.

The lower baffle 218 is connected to the frame 212 and is located underneath the upper baffle 216. The lower baffle 218 may be adjustably connected to the frame 212 via fasteners (unnumbered). The spatial relationship of the upper and lower baffles 216, 218 defines a space or passageway through which the travel path of the wrapping material 202 extends. The lower baffle 218 may have a bent body 220 with a width 218W and multiple sections 222, 224, 226. For instance, the body 220 may have a first, lower section 222 with an edge, a downwardly slanted middle section 224, and a second, upper section 226 that defines another edge located at an approximate middle of the lower baffle 218 (FIG. 4). The slanted middle section 224 may thereby connect the lower and upper sections 222, 226 together. It should be appreciated that the lower baffle 218 may have more than three sections which are slanted relative to one another. The lower baffle 218 may comprise any desired material.

The lower baffle 218 may further include a first set of grippers 230 linearly positioned across the width 218W at a first location, and a second set of grippers 232 linearly positioned across the width 218W at a second location (FIG. 4). Each set of grippers 230, 232 may respectively include at least two grippes 230, 232. The lower grippers 230 are located at the edge of the lower section 222. The upper grippers 232 are proximally located away from the edge of the lower section 222. The upper grippers 232 are located at the edge of the upper section 226 upstream of and above the lower grippers 230. The upper grippers 232 thus extend at least partially over the slanted middle section 224. The upper grippers 232 contact the wrapping material 202 before the lower grippers 230. The grippers 230, 232 may be in the form of any desired grippers, such as gripper tabs 230, 232. The gripper tabs 230, 232 may at least partially extend into the travel path of the wrapping material 202 in order to engage with the wrapping material 202 (FIG. 3). Thus, when the wrapping material 202 travels over the lower baffle 218, the grippers 230, 232 respectively engage with and retain the wrapping material 202 so that the wrapping material 202 is spread across the width 218W of the lower baffle 218. The lower grippers 230 may extend along the full width 218W, and the upper grippers 232 may not extend completely across the full width 218W. The grippers 230, 232 may be integral with the body 220 of the lower baffle 218. Alternatively, the grippers 230, 232 may be separate elements which are removably and/or fixedly attached to the body 220 of the lower baffle 218. The grippers 230, 232 may have the same shape and size, or the grippers 230, 232 may differ in size and shape from one another. The grippers 230, 232 may comprise any desired material.

In operation, the wrapper 200 automatically spreads and applies the wrapping material 202 onto the bale. As the wrapping material 202 passes through the duckbill assembly 210, the upper grippers 232 will retain and spread the wrapping material 202 across the width 218W of the lower baffle 218. Subsequently, as the wrapping material 202 travels further down through the passageway between the baffles 216, 218, the lower grippers 230 will retain and spread the wrapping material 202. Thus, the grippers 230, 232 act in tandem to consistently keep the wrapping material 202 at its maximum possible width, and thereby the entire width of the bale is sufficiently covered by the wrapping material 202. As can be appreciated, the gap or space between the wrapping material 202 and the baffles 216, 218, as shown in FIG. 3, is for illustrative purposes only; and hence, the wrapping material 202 may directly contact the upper and/or lower baffle 216, 218.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

The invention claimed is:

1. A duckbill assembly of a wrapper for an agricultural baler, comprising:
   a frame;
   at least one roller movably connected to the frame and configured for spreading a wrapping material;
   an upper baffle connected to the frame; and
   a lower baffle connected to the frame and located underneath the upper baffle, and the lower baffle comprising a width, a first set of grippers, and a second set of grippers, the first and second set of grippers are configured for spreading the wrapping material across the width of the lower baffle, wherein the lower baffle further includes a first edge, and the first set of grippers are located at the first edge, the second set of grippers are proximally located away from the first edge.

2. The duckbill assembly of claim 1, wherein the first set of grippers are linearly positioned across the width of the lower baffle at a first location and the second set of grippers are linearly positioned across the width of the lower baffle at a second location.

3. The duckbill assembly of claim 1, wherein the lower baffle further comprising a bent body with a first section and a second section located above the first section.

4. The duckbill assembly of claim 3, wherein the first set of grippers are located on the first section and the second set of grippers are located on the second section such that the second set of grippers are located above the first set of grippers.

5. The duckbill assembly of claim 4, wherein the lower baffle further comprising a downwardly slanted middle section located in between and connecting the first section and the second section, the second section defines a second edge, and the second set of grippers are located at the second edge such that the second set of grippers at least partially extend over the slanted middle section.

6. The duckbill assembly of claim 1, wherein the first and second set of grippers are in the form of tabs.

7. The duckbill assembly of claim 6, wherein the wrapping material has a travel path through the duckbill assembly which extends in between the upper baffle and the lower baffle, and the first and second set of tabs at least partially extend into the travel path of the wrapping material.

8. A duckbill assembly of a wrapper for an agricultural baler, comprising:
   a frame;

at least one roller movably connected to the frame and configured for spreading a wrapping material;
an upper baffle connected to the frame; and
a lower baffle connected to the frame and located underneath the upper baffle, and the lower baffle comprising a width, a first set of grippers, and a second set of grippers, the first and second set of grippers are configured for spreading the wrapping material across the width of the lower baffle, wherein the second set of grippers are located upstream of the first set of grippers.

9. An agricultural baler, comprising
a main frame;
a pickup unit connected to the main frame and configured for lifting a crop material from a field;
a bale chamber located downstream of the pickup unit and configured for forming a bale; and
a wrapper connected to the main frame and comprising a duckbill assembly configured for spreading and applying a wrapping material onto the bale, the duckbill assembly comprising:
a frame;
at least one roller movably connected to the frame and configured for spreading a wrapping material;
an upper baffle connected to the frame; and
a lower baffle connected to the frame and located underneath the upper baffle, the lower baffle comprising a width, a first set of grippers, and a second set of grippers, and the first and second set of grippers are configured for spreading the wrapping material across the width of the lower baffle, wherein the lower baffle further comprising a first edge, and the first set of grippers are located at the first edge, the second set of grippers are proximally located away from the first edge.

10. The agricultural baler of claim 9, wherein the first set of grippers are linearly positioned across the width of the lower baffle at a first location and the second set of grippers are linearly positioned across the width of the lower baffle at a second location.

11. The agricultural baler of claim 9, wherein the lower baffle further comprising a bent body with a first section and a second section located above the first section.

12. The agricultural baler of claim 11, wherein the first set of grippers are located on the first section and the second set of grippers are located on the second section such that the second set of grippers are located above the first set of grippers.

13. The agricultural baler of claim 12, wherein the lower baffle further comprising a downwardly slanted middle section located in between and connecting the first section and the second section, the second section defines a second edge, and the second set of grippers are located at the second edge such that the second set of grippers at least partially extend over the slanted middle section.

14. The agricultural baler of claim 9, wherein the first and second set of grippers are in the form of tabs.

15. The agricultural baler of claim 14, wherein the wrapping material has a travel path through the duckbill assembly which extends in between the upper baffle and the lower baffle, and the first and second set of tabs at least partially extend into the travel path of the wrapping material.

16. An agricultural baler, comprising
a main frame;
a pickup unit connected to the main frame and configured for lifting a crop material from a field;
a bale chamber located downstream of the pickup unit and configured for forming a bale; and
a wrapper connected to the main frame and comprising a duckbill assembly configured for spreading and applying a wrapping material onto the bale, the duckbill assembly comprising:
a frame;
at least one roller movably connected to the frame and configured for spreading a wrapping material;
an upper baffle connected to the frame; and
a lower baffle connected to the frame and located underneath the upper baffle, the lower baffle comprising a width, a first set of grippers, and a second set of grippers, and the first and second set of grippers are configured for spreading the wrapping material across the width of the lower baffle, wherein the second set of grippers are located upstream of the first set of grippers.

17. A method for operating an agricultural vehicle, comprising:
providing a duckbill assembly of a wrapper for the agricultural vehicle, the duckbill assembly comprising a frame, at least one roller movably connected to the frame and configured for spreading a wrapping material, an upper baffle connected to the frame, and a lower baffle connected to the frame and located underneath the upper baffle, and the lower baffle comprising a width, a first set of grippers linearly positioned across the width of the lower baffle at a first location, and a second set of grippers linearly positioned across the width of the lower baffle at a second location, and the wrapping material has a travel path through the duckbill assembly which extends in between the upper baffle and the lower baffle;
spreading, by the second set of grippers, the wrapping material across the width of the lower baffle at the second location;
spreading, by the first set of grippers, the wrapping material across the width of the lower baffle at the first location, which is downstream of the second location along the travel path of the wrapping material; and
applying, by the duckbill assembly, the wrapping material onto a bale such that a width of the bale is covered by wrapping material.

18. The method of claim 17, wherein the lower baffle further comprising a first edge, and the first set of grippers are located at the first edge, the second set of grippers are proximally located away from the first edge.

* * * * *